(12) United States Patent
Areno et al.

(10) Patent No.: US 10,878,101 B2
(45) Date of Patent: Dec. 29, 2020

(54) TRUSTED BOOTING BY HARDWARE ROOT OF TRUST (HROT) DEVICE

(71) Applicant: Raytheon Company, Waltham, MA (US)

(72) Inventors: Matthew C. Areno, Round Rock, TX (US); John C. Hoffman, Fairview, TX (US); Trevor B. Hird, Austin, TX (US); Eric P. Egalite, San Antonio, TX (US); Nathan T. Palmer, Austin, TX (US)

(73) Assignee: Raytheon Company, Waltham, MA (US)

( * ) Notice: Subject to any disclaimer, the term of this patent is extended or adjusted under 35 U.S.C. 154(b) by 61 days.

(21) Appl. No.: 16/214,857

(22) Filed: Dec. 10, 2018

(65) Prior Publication Data

US 2020/0082091 A1    Mar. 12, 2020

Related U.S. Application Data

(60) Provisional application No. 62/728,223, filed on Sep. 7, 2018.

(51) Int. Cl.
*G06F 21/57*    (2013.01)
*G06F 9/4401*    (2018.01)

(52) U.S. Cl.
CPC .......... *G06F 21/575* (2013.01); *G06F 9/4401* (2013.01); *G06F 2221/033* (2013.01)

(58) Field of Classification Search
CPC .............. G06F 1/32; G06F 9/44; G06F 21/57
See application file for complete search history.

(56) References Cited

U.S. PATENT DOCUMENTS 6,473,857 B1   10/2002 Panas et al.
7,260,555 B2    8/2007 Rossmann et al.
(Continued)

FOREIGN PATENT DOCUMENTS

EP    1 764 721 A2   3/2007
EP    3 422 661 A1   1/2019
(Continued)

OTHER PUBLICATIONS

U.S. Appl. No. 16/255,917, filed Jan. 24, 2019, Areno et al.
(Continued)

*Primary Examiner* — Keshab R Pandey
(74) *Attorney, Agent, or Firm* — Daly Crowley Mofford & Durkee, LLP

(57) ABSTRACT

The concepts, systems and methods described herein are directed towards a method running on a security device. The method is provided to including: executing a first secure boot code from a first memory by one of a plurality of cores of a processor, wherein the plurality of cores runs in a secure world; executing a first-stage boot loader (FSBL) from a second memory; executing a security monitoring application to validate the security device; in response to the security device being validated, switching some of the plurality of cores from the secure world to a normal world, wherein at least one of the plurality of cores remains in the secure world to communicate with the security monitoring application; executing a second-stage boot loader (SSBL); and monitoring, via the security monitoring application, status of the security device and communications between the security device and at least one external system.

16 Claims, 11 Drawing Sheets

(56) References Cited

U.S. PATENT DOCUMENTS

| | | | |
|---|---|---|---|
| 9,235,709 B2 | 1/2016 | Kim et al. | |
| 9,251,343 B1 | 2/2016 | Vincent et al. | |
| 9,319,380 B2 | 4/2016 | Lukacs et al. | |
| 9,600,291 B1 | 3/2017 | Atsatt | |
| 9,626,512 B1 | 4/2017 | Brandwine et al. | |
| 10,027,717 B2 | 7/2018 | Ben-Shalom et al. | |
| 2004/0003262 A1 | 1/2004 | England et al. | |
| 2005/0138409 A1 | 6/2005 | Sheriff et al. | |
| 2006/0015748 A1* | 1/2006 | Goto | G06F 13/24 713/190 |
| 2006/0026417 A1 | 2/2006 | Furusawa et al. | |
| 2008/0307488 A1 | 12/2008 | Hammond, II et al. | |
| 2009/0204964 A1 | 8/2009 | Foley et al. | |
| 2010/0070743 A1 | 3/2010 | Grigor et al. | |
| 2010/0250796 A1 | 9/2010 | Jevans et al. | |
| 2014/0298026 A1* | 10/2014 | Isozaki | G06F 21/53 713/171 |
| 2016/0125187 A1 | 5/2016 | Oxford | |
| 2016/0378996 A1 | 12/2016 | Smith et al. | |
| 2017/0180318 A1 | 6/2017 | Lutas et al. | |
| 2017/0213053 A1* | 7/2017 | Areno | G06F 21/74 |
| 2017/0364685 A1* | 12/2017 | Shah | G06F 21/53 |
| 2018/0034793 A1 | 2/2018 | Kibalo et al. | |
| 2018/0089425 A1 | 3/2018 | Trikalinou | |
| 2018/0165448 A1 | 6/2018 | Nightingale et al. | |
| 2018/0365425 A1* | 12/2018 | Packer Ali | G06F 21/575 |

FOREIGN PATENT DOCUMENTS

| | | |
|---|---|---|
| KR | 10-1772314 B1 | 9/2017 |
| WO | WO 2010/030157 A1 | 3/2010 |
| WO | WO 2019/023289 A1 | 1/2019 |

OTHER PUBLICATIONS

U.S. Appl. No. 16/371,191, filed Apr. 1, 2019, Areno et al.
U.S. Appl. No. 16/398,641, filed Apr. 30, 2019, Areno et al.
PCT International Search Report and Written Opinion dated May 31, 2019 for International Application No. PCT/US2019/022879; 16 Pages.
Lohrke et al., "No Place to Hide: Contactless Probing of Secret Data on FPGAs;" Conference Paper from International Conference on Cryptographic Hardware and Embedded Systems (CHES 2016); Aug. 4, 2016; pp. 147-167; 21 Pages.
U.S. Appl. No. 16/722,142, filed Dec. 20, 2019, Hird et al.
U.S. Appl. No. 16/832,192, filed Mar. 27, 2020, Staab.
U.S. Appl. No. 16/832,216, filed Mar. 27, 2020, Staab et al.
Cooper et al., "BIOS Protection Guidelines," *National Institute of Standards and Technology*—Special Publication 800-147; U.S. Department of Commerce; Apr. 2011; 26 Pages.
Regenscheid, "BIOS Protection Guidelines for Servers;" *National Institute of Standards and Technology*—NIST Special Publication 800-147B; U.S. Department of Commerce; Aug. 2014; 32 Pages.
Regenscheid et al., "BIOS Integrity Measurement Guidelines (Draft);" *National Institute of Standards and Technology*—Special Publication 800-155; U.S. Department of Commerce; Dec. 2011; 47 Pages.
Trusted Computing Group, "Trusted Platform Module Library, Part 1: Architecture;" Family "2.0", Level 00, Revision 01.16; TCG Published; Oct. 30, 2014; Part 1 of 2; 147 Pages.
Trusted Computing Group, "Trusted Platform Module Library, Part 1: Architecture;" Family "2.0", Level 00, Revision 01.16; TCG Published; Oct. 30, 2014; Part 2 of 2; 121 Pages.
Wilkins et al., "UEFI Secure Boot in Modern Computer Security Solutions;" www.UEFI.org; Sep. 2013; 10 Pages.
PCT International Search Report and Written Opinion dated Jun. 26, 2020 for International Application No. PCT/US2019/045608; 16 Pages.
PCT International Search Report and Written Opinion dated Jun. 25, 2020 for International Application No. PCT/US2020/025178; 12 Pages.
PCT International Search Report and Written Opinion dated Jul. 13, 2020 for International Application No. PCT/US2020/025195; 12 Pages.
PCT International Search Report and Written Opinion dated Jul. 14, 2020 for International Application No. PCT/US2019/045610; 12 Pages.
PCT International Search Report and Written Opinion dated Aug. 11, 2020 for International Application No. PCT/US2019/045607; 12 Pages.

* cited by examiner

TRUSTED BOOTING BY HARDWARE ROOT OF TRUST (HROT) DEVICE

TECHNICAL FIELD

The concepts, systems, circuits, devices and techniques described herein relate generally to security systems and more particularly to security systems providing a secure booting process.

BACKGROUND

As is known in the art, providing high confidence in the execution of standard commercial off-the-shelf (COTS) computers is a challenge for numerous programs. The processors deployed on such systems are in high demand due to their performance capabilities, but there is little to no confidence in the secure execution of native applications. This limitation is due to a lack of trust in the supply chain and the continued adherence of systems to the required guidelines. Being able to evaluate and monitor the boot process of these systems and then provide continuous monitoring of their execution state is required to a number of programs.

SUMMARY

In accordance with the concepts, techniques and systems described herein is an efficient method for providing a secure booting process. The techniques and systems described herein may provide a security solution working on a majority of modern systems with little to no modifications to the commercial off-the-shelf systems.

According to one illustrative embodiment, a method running on a security device may include: executing a first secure boot code from a first memory by one of a plurality of cores of a processor, wherein the plurality of cores runs in a secure world; executing a first-stage boot loader (FSBL) from a second memory; executing a security monitoring application to validate the security device; in response to the security device being validated, switching some of the plurality of cores from the secure world to a normal world, wherein at least one of the plurality of cores remains in the secure world to communicate with the security monitoring application; executing a second-stage boot loader (SSBL); and monitoring, via the security monitoring application, status of the security device and communications between the security device and at least one external system.

In one aspect, the FSBL may be authenticated, decrypted, and loaded onto the second memory before the FSBL is executed.

In one aspect, a software portion of the security monitoring application may run on the second memory and a hardware portion of the security monitoring application may run on a programmable logic (PL) area.

In one aspect, the method may further include loading at least one secure application that is executed by at least one of the plurality of cores that runs in the secure world. Herein the at least one secure application may be configured to communicate with the security monitoring application.

In one aspect, the at least one secure application may be configured to communicate with a trusted platform module (TPM) device. Herein, the method may further include loading at least one regular application that is executed by one of the plurality of cores that runs in the normal world, wherein the at least one regular application communicates with the at least one secure application to perform any transactions.

In one aspect, only one of the plurality of cores may operate to execute the first secure boot code.

In one aspect, the SSBL may be authenticated, decrypted, and stored into the second memory before the SSBL is executed.

According to another illustrative embodiment, a system for secure booting may include a security device comprising a processor, wherein the processor comprises a plurality of cores, a first memory, and a second memory. Herein, the plurality of cores may be configured to: execute a first secure boot code from the first memory by one of the plurality of cores, wherein the plurality of cores runs in a secure world; execute a first-stage boot loader (FSBL) from the second memory; execute a security monitoring application to validate the security device; in response to the security device being validated, switch some of the plurality of cores from the secure world to a normal world, wherein at least one of the plurality of cores remains in the secure world to communicate with the security monitoring application; execute a second-stage boot loader (SSBL); and monitor, via the security monitoring application, status of the security device and communications between the security device and at least one external system.

In one aspect, the security device may comprise a Hardware Root of Trust (HRoT) device.

In one aspect, the first memory may comprise an internal boot read-only memory (ROM).

In one aspect, the second memory may comprise an on-chip memory (OCM).

In one aspect, the FSBL may be authenticated, decrypted, and loaded onto the second memory before the FSBL is executed.

In one aspect, the system may further include a programmable logic (PL) area. Herein, a software portion of the security monitoring application may run on the second memory and a hardware portion of the security monitoring application may run on the PL area.

In one aspect, the plurality of processors may be further configured to load at least one secure application that is executed by at least one of the plurality of cores that runs in the secure world, wherein the at least one secure application is configured to communicate with the security monitoring application.

According to yet another illustrative embodiment, a Hardware Root of Trust (HRoT) device may include: a processor having a plurality of cores, a first memory and a second memory. Herein, the plurality of processors may be configured to: execute a first secure boot code from the first memory, wherein the plurality of cores runs in a secure world; execute a first-stage boot loader (FSBL) from the second memory; execute a security monitoring application to validate the HRoT device; in response to the computer being validated, switch some of the plurality of cores from the secure world to a normal world, wherein at least one of the plurality of cores remains in the secure world to communicate with the security monitoring application; execute a second-stage boot loader (SSBL); and monitor, via the security monitoring application, status of the HRoT device and communications between the HRoT device and at least one external system.

In one aspect, the first memory may comprise an internal boot read-only memory (ROM).

In one aspect, the second memory may comprise an on-chip memory (OCM).

In one aspect, the HRoT device may further include a programmable logic (PL) area. Herein, a software portion of the security monitoring application may run on the plurality of cores and a hardware portion of the security monitoring application may run on the PL area.

The details of one or more embodiments of the disclosure are outlined in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which.

DETAILED DESCRIPTION

Figure 1:
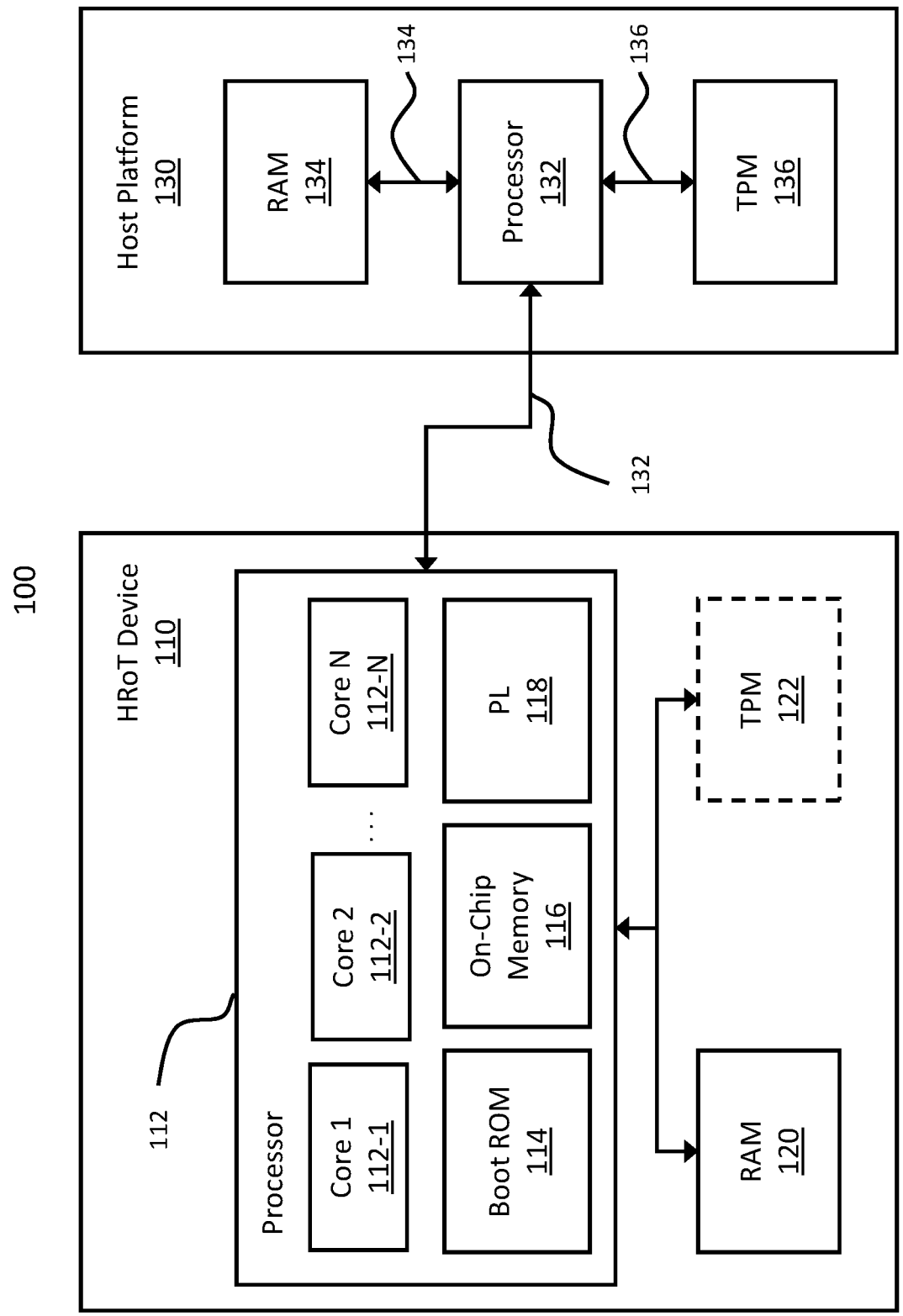
FIG. 1 is a block diagram of an illustrative security system including a Hardware Root of Trust (HRoT) device according to the concepts described herein.

Relative descriptions used herein, such as left, right, up, and down, are with reference to the figures, are merely relative and not meant in a limiting sense. Additionally, for clarity, common items and circuitry, such as integrated circuits, resistors, capacitors, transistors, and the like, have not been included in the figures, as can be appreciated by those of ordinary skill in the pertinent art. Unless otherwise specified, the illustrated embodiments may be understood as providing illustrative features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

For convenience, certain introductory concepts and terms used in the specification are collected here.

As used herein, the term "Root of Trust (RoT)" is used to describe a trusted computing module that provides a set of functions that are trusted by other modules in a computing environment, such as an Operating System (OS). The RoT may serve as an independent computing module providing authenticity in a computer or mobile device in which it is embedded. The term "Hardware Root of Trust (HRoT)" device is used to describe a hardware device that provides RoT functions. The HRoT device generally provides, but not limited to, performing device authentication to ensure that hardware has not been tampered with; verifying the authenticity of software, particularly boot images, to ensure they haven't been tampered with; providing One-Time Programmable (OTP) memory for secure key storage to facilitate encryption; and ensuring that the system is able to be brought into a known and trusted state.

As used herein, the term "secure cryptoprocessor" is used to describe a module, microprocessor or chip that is dedicated for carrying out operations in secure communications, or cryptographic operations. The secure cryptoprocessor may be embedded in packaging with multiple physical security measures, which provide a certain level of tamper resistance. In contrast to insecure cryptographic processors that output decrypted data onto a bus in a secure environment, the secure cryptoprocessor refrains from outputting decrypted data or decrypted instructions in an environment when there is no guarantee that security is always maintained.

As used herein, the term "Trusted Platform Module (TPM)" is used to describe a specialized device for hardware authentication. The TPM specification is defined by an international standard (ISO/IEC 11889). The TPM comprises a dedicated microcontroller that provides secure storage, key generation, and cryptographic operations.

As used herein, the term "Platform Configuration Register (PCR)" is used to describe security relevant metrics. PCR is a feature of a TPM. PCRs generally maintain cryptographic measurements of software state including the software running on a platform and any configuration data used by that software. The metrics provided by the PCR may be used to detect changes to previously known configurations of the system and decide how to proceed.

Referring now to FIG. 1, an illustrative security system 100 may include a Hardware Root of Trust (HRoT) device 110 and a host platform 130 in accordance with example embodiments of the invention. The HRoT device 110 and the host platform 130 may be respective independent systems with similar setups. Each of the systems may have its own processor, memory and other interfaces. The HRoT device 110 may include a multi-core processor 112, memory 120, and an optional Trusted Platform Module (TPM) 122. The host platform 130 may include a central processing unit (CPU) 132, TPM device 136, and memory 134.

The HRoT device 110 comprises a security device that provides a set of functions that are trusted by other modules in a computing environment. The processor 112 of the HRoT device 110 may include one or more cores 112-1, 112-2, . . . 112-N. In some embodiments, the cores may support execution in isolated execution environments, known as the Secure World (SecW) and Normal World (NorW). The processor 112 may also include a boot read-only memory (ROM) 114, on-chip memory 116, and programmable logic (PL) 118. A processor (e.g., 112) of an HRoT device generally requires higher security features than a typical processor being used in a system that does not require higher security. In some embodiments, the processor 112 may be a normal microprocessor or field-programmable gate array (FPGA). In a case that the processor comprises a FPGA, the PL is part of the processor. The boot ROM 114 can be a place that the HRoT device loads and executes secure boot code that initializes a secure booting procedure. The on-chip memory 116 may perform as storage for boot loader codes that are loaded and executed by the secure boot code. The on-chip memory 116 may be volatile and maintain OS and other application for operation of the processor 112. The PL 118 may perform as a storage for a security monitoring application that is loaded and executed by the boot loader codes. In some embodiments, a TPM may be included in an HRoT device, and the processor 112 may bind to the TPM 122 inside of the HRoT device 110 by using a binding procedure that is similar to a binding procedure that will be described in conjunction at least with FIGS. 4 and 5. As can be appreciated by those of ordinary skill in the pertinent art, the processor 112 may have more or lesser number of on-chip and off-chip storages than what is described in FIG. 1. In some embodiments, the secure boot code and boot loader codes may be loaded and executed in the same on-chip or off-chip memory, for example BIOS flash in an Intel processor. In another embodiment, the security monitoring app may be loaded and executed in the same memory or storage where the boot codes are loaded. Those of ordinary skill in the pertinent art would also appreciate that the structure of processor 132 in the host platform 130 may have similar structure with the processor 112 in the HRoT device 110.

When the processor 112 of the HRoT device 110 initiates the booting procedure, the cores 112-1, 112-2, . . . 112-N stay in the secure world and remains in this state until transitioned into the normal world. In some embodiments, the beginning of the boot sequence may start with the Processing System (PS) and not the Programmable Logic (PL) as conventional integrated circuits. For example, FPGAs may include a hard-core processor which physically instantiates a logic in the processor, for example the logic in the Boot ROM 114. Once the cores 112-1, 112-2, . . . 112-N are powered on, the cores begin executing boot code located inside of the internal boot-ROM 114. In an example embodiment, only one core (e.g., 112-1) among the cores 112-1, 112-2, . . . 112-N executes the entire boot code, while the other cores remain in a holding pattern waiting to be initialized by the initially executing processor core 112-1. At this stage, the programmable logic (PL) area 118 is not used or initialized. In other embodiments, in a processor without a hard-coded logic, the processor may load PS into PL area to instantiate a boot sequence. For example, a microblaze, which is a soft microprocessor core, may be used instead of a hardcore of the processor.

The next stage of the boot sequence may include loading, validating, and executing First-Stage Boot Loader (FSBL). The FSBL may be loaded and executed on the on-chip memory 116. By doing so, the HRoT device may provide a high degree of trust during execution since there is no external system involved when executing the FSBL. In some embodiments, the FSBL may be decrypted and authenticated prior to execution to ensure that the FSBL code and the on-chip memory 116 that contains the FSBL are not tampered with (i.e., the security of the software and/or hardware has not been breached). As described above, the FSBL may be loaded and executed in other memory, as can be appreciated by those of ordinary skill in the pertinent art.

Then, the HRoT device 110 may load and execute a security monitoring application (sometimes referred as "SecMon"). The security monitoring application may be loaded and executed in the PL 118. The security monitoring application provides a 'tamper detection mechanism' by intercepting events such as voltage changes, clock skewing, and/or Joint Test Action Group (JTAG) connection for example. In an embodiment, the JTAG connection connects to an on-chip test access port (TAP) of a chip and may access a set of test registers to test various parts of the chip and detect issues with the chip, for example, a circuit fault. The security monitoring application may also monitor inputs and outputs to/from the system. Before moving to a next stage, the security monitoring application validates the current state of the hardware, and upon successful validation of the hardware, the boot sequence may continue.

The FSBL may load a secure application that will run on a core (e.g., 112-1) that runs in the normal world, which communicates to at least one core in the secure world. The size and functionality of this additional application may be varied depending on the functionalities of the application, but the application should at least be able to control access to an interconnect bus 132 connecting to the host platform 130, for example a Peripheral Component Interconnect Express (PCIe) bus, in order to facilitate communications with the TPM 136. That is, the application should be able to communicate to the TPM through the interconnect bus 132, 136. In addition, the secure application may conduct periodic handshakes with the security monitoring application in PL 118 to ensure that both are always up and running and continually monitor both the hardware and software security of the system.

When the security of the entire system is verified, the FSBL then loads the Second-Stage BootLoader (SSBL) into the normal world. Then, one or more cores (e.g., 112-2 . . . 112-N) transition into the normal world and continue the boot process. When the boot process is completed, other regular applications may be loaded and executed on the system. In some embodiments, any specific applications that need to run on the HRoT, for example, an application that is used to interface with the TPM 136, may be loaded. Although this application runs inside the normal world, it may call into the secure world to perform the actual transactions, as the required interface is only available from the secure world. Alternatively, the application may communicate directly to the TPM while the monitor in the secure world validates the normal world application. The transactions between a normal world application and the TPM 136 are authorized only when the security of the normal world is verified.

The TPM 136 on the host system 130 is used to both validate the boot sequence of the host system, as well as to associate a specific host system with a specific HRoT device. Support for these purposes is provided in different operating modes: discovery mode and operational mode. In Discovery mode, the HRoT device 110 may bind itself to a target platform and integrate itself into the boot sequence of the host system by establishing an association to the TPM 136. Once the discovery has completed, the HRoT device 110 moves into operational mode, allowing the system to boot and run as expected once the security of the system is verified. The details of these operational modes are presented below in detail at least in conjunctions with FIGS. 4 and 5.

Figure 2:
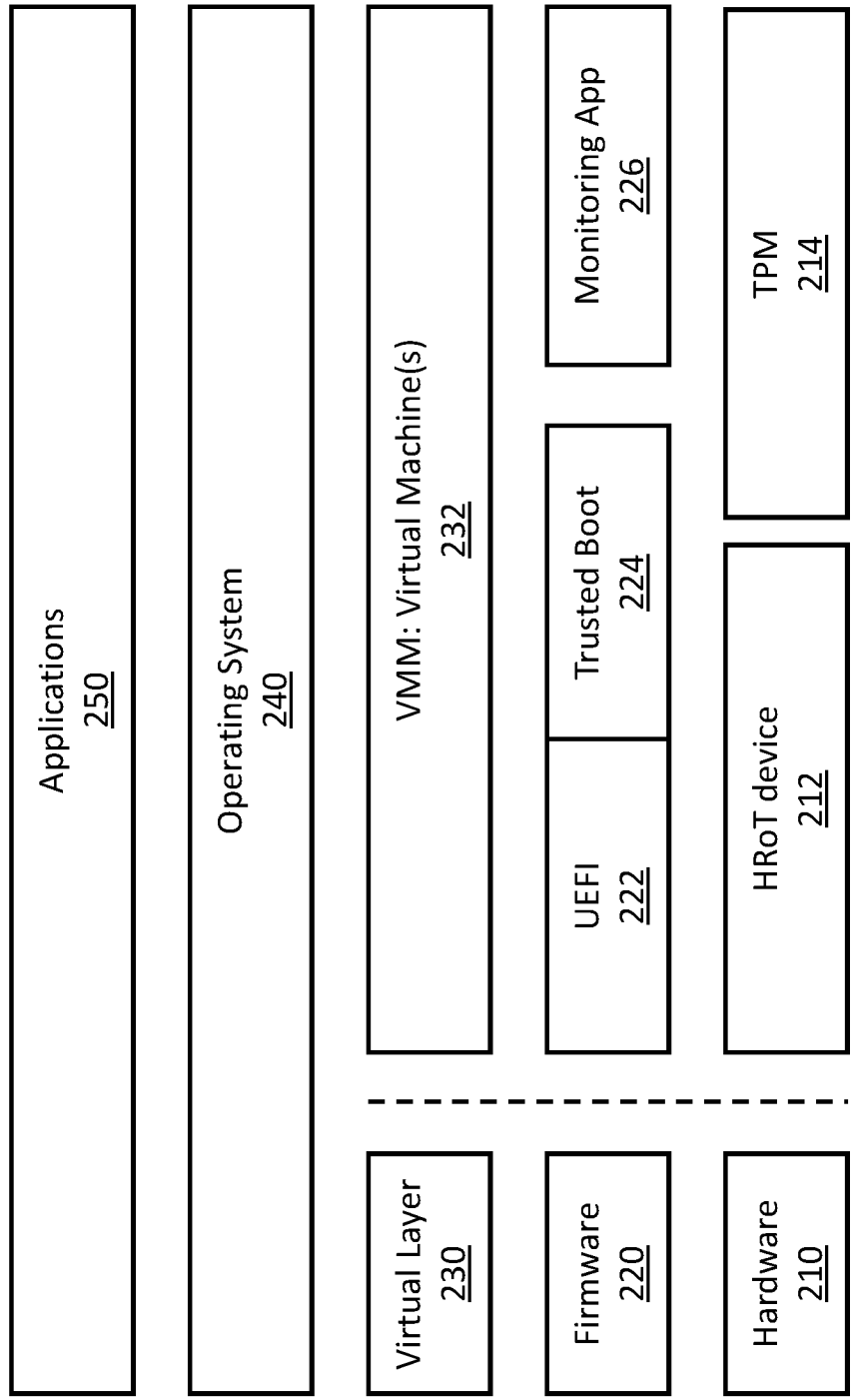
FIG. 2 is a block diagram showing an architecture of a Hardware Root of Trust (HRoT) according to the concepts described herein.

Referring now to FIG. 2, the architecture of a Hardware Root of Trust (HRoT) is presented. The HRoT architecture 200 may have a plurality of layers including hardware 210, firmware 220, virtual layer 230, operating system 240, and applications 250. The hardware layer 210 of the HRoT architecture includes an HRoT device 212 and TPM 214 as described in conjunction with FIG. 1. The HRoT device is a computing module that is trusted by other modules in the architecture. As described above, the HRoT device 212 generally provides, but not limited to, performing device authentication to ensure that a hardware has not been tampered with; verifying the authenticity of software, particularly boot images, to ensure they haven't been tampered with; providing One-Time Programmable (OTP) memory for secure key storage to facilitate encryption; and/or ensuring that the system is able to be brought into a known and trusted state. The firmware layer 220 includes Unified Extensible Firmware Interface (UEFI) code 222, trusted boot code 224, and a security monitoring application 224. Here, the UEFI code 222 and the trusted boot code 224 are shown as separate, but during execution, the UEFI 222 and trusted boot 224 are in a single booting process. In some embodiments, the UEFI code 222 is stored in an electrically erasable programmable ROM (EEPROM). The booting process with the UEFI 222 will be described in detail in conjunction with FIG. 6. The security monitoring application 226 may perform monitoring of software and hardware of the system as described above in conjunction with FIG. 1.

The UEFI code 222 is a secure boot code based upon UEFI specification. The UEFI specification supports advanced boot options and utilizes 64-bit address ranges. The UEFI also supports a Secure Boot mechanism. The Secure Boot mechanism may provide a way to authenticate codes that are involved with a system startup. The first code executed in a boot sequence on most computer systems is usually stored in some form of programmable read-only memory (ROM). This code is responsible for identifying the location of the UEFI codes, authenticating it, and loading it into memory. For example, a processor (e.g., 112 in FIG. 1) may execute secure boot codes from the boot ROM 114. Then the secure boot codes may load and execute the UEFI codes. Once loaded, the UEFI codes can bring in additional code pieces in the form of drivers, optional ROMs, and additional applications, which might be necessary for the continuation of the boot process. The key item that the UEFI must find is the boot loader responsible for loading the OS. The boot loader, once found, is authenticated, loaded, and begins execution. This boot loader will then authenticate and load the OS kernel, which will load the other codes necessary for its functionality. In some embodiments, the drivers and applications for the OS are not required to go through authentication as part of the secure boot process.

One of the primary assumptions made during the secure boot process is that the integrity of the original ROM has not been tampered with. Additionally, it may be also assumed that the storage device containing the UEFI code has not been replaced or altered. In some embodiments, the boot ROM may measure itself and the UEFI codes, and the boot ROM then sends those measurements to a Trusted Platform Module (TPM). The trustworthiness of the ROM code represents the primary security concern as the TPM cannot validate the measurements sent to it, because the TPM is a passive device that does not perform any independent operations.

To address these concerns, the National Institute of Standards and Technology (NIST) released specifications listing approved/needed mitigations to protect systems from modification, which provide guidelines for securing the BIOS/UEFI update process to prevent modification of code by attackers. The specifications are described in "BIOS Protection Guidelines SP 800-147," published April 2011 and "BIOS Protection Guidelines for Servers SP 800-147B," published August 2014, which are incorporated by reference. According to the specifications, there are three key features that need to be considered and incorporated to provide the most secure system: 1) providing the hardware support necessary to implement credible Roots of Trust for BIOS integrity measurements; 2) enabling endpoints to measure the integrity of BIOS executable components and configuration data components at boot time; and 3) securely transmitting measurements of BIOS integrity from endpoints to a separate entity that can determine the current security state of the system by retrieving the required measurements and validations via a trusted channel from the system. Using TPM may satisfy the first and second requirements and using HRoT device may satisfy the third requirement.

The virtual layer 230 may include one or more virtual machines 232. Virtualization technology provides the capability to support concurrent execution of multiple operating system environments. A controlling module or software that handles virtual machines is called a Virtual Machine Monitor (VMM) or a Hypervisor. The VMM is similar to the kernel process for standard Operating Systems, including hardware support. The VMM is responsible for presenting the virtual hardware interface to execution environments, handling scheduling of system resources between environments, and allocating required resources as needed by each environment. The virtual layer architecture will be described in detail in conjunction with FIG. 7. In some embodiments, the virtual layer may not be used, and the HRoT architecture may load an Operating System (OS) 240 on top of the hardware layer 210 and firmware layer 220. The OS may be a conventionally used operating system, such as Microsoft Windows, Linux, MacOS, or any other suitable operating system. After a selected OS is loaded, one or more applications 250 may be loaded an executed. The applications 250 may run either in the normal world or the secure world. If an application running in the normal world executes transactions with the TPM 214, the application must be verified by the HRoT device 212 before performing any transactions.

Figure 2A:
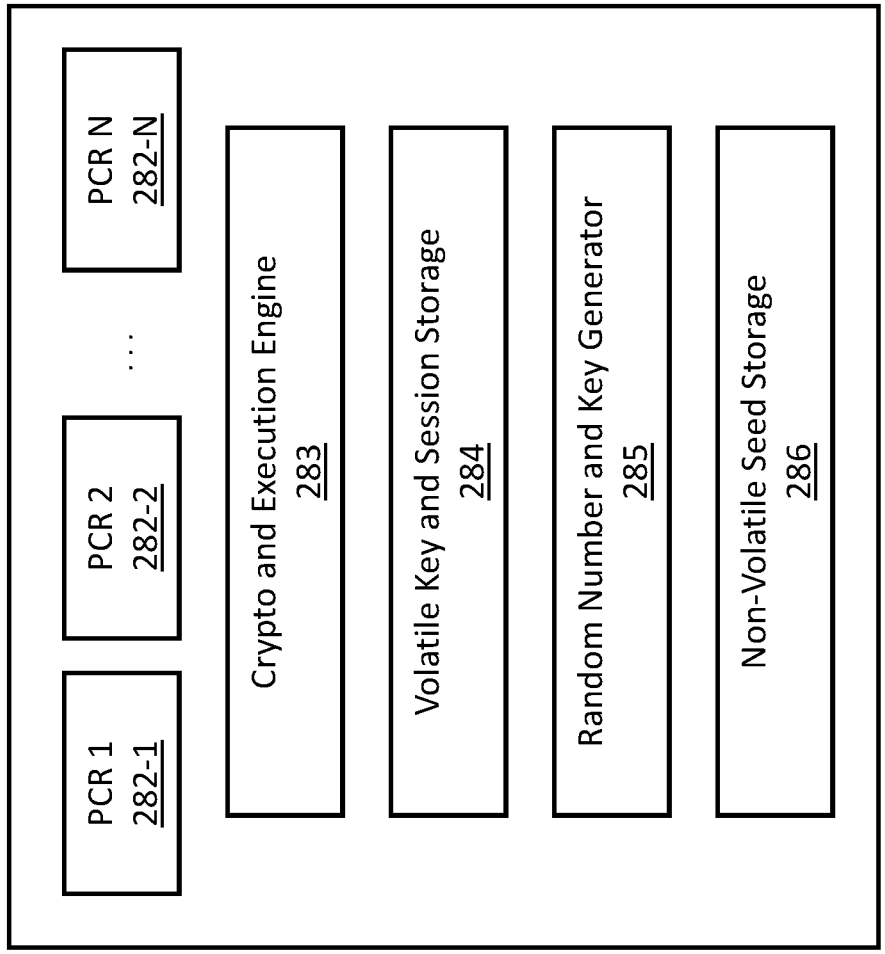
FIG. 2A is a block diagram showing the architecture of a Trusted Platform Module (TPM) according to the concepts described herein.

Referring now to FIG. 2A, an example Trusted Platform Module (TPM) 280 comprises a small device designed to provide computer systems with trusted storage of measurements, various cryptographic accelerators, and key and random number generation. A common base architecture and collection of algorithms to support the functionalities of the TPM should be compliant with the Trusted Computing Group's (TCG) TPM specification (2014). However, the algorithms and storage structures to support the functionality can vary depending on embodiments of the functionalities.

The two types of memory elements of the TPM—non-volatile and volatile—maintain and store key materials that can be used to validate different code segments during a secure boot process of a system, as described in conjunction with FIG. 1, and protect measurements of the codes executed on the system. The TPM contains one or more seeds that are used to generate unique keys. The seeds are large random values that the TPM can use to generate symmetric keys, asymmetric keys, other seeds, or proof values. In some embodiments, the keys are unique for each device. While the TPM maintains seeds for regenerating the unique keys, the TPM may also support generating and loading additional keys inside the TPM to support other hardware and software vendors using codes that must run during a secure booting process. For example, the TPM may support using codes that need to run during the execution of the UEFI code (222 in FIG. 2).

The seeds of the TPM may be stored inside the TPM, and though the TPM can overwrite seeds upon certain conditions, the seeds cannot be extracted from the TPM. The TPM may use platform and endorsement seeds to recreate keys that belong to a manufacturer of the TPM, while the owners of the equipment can control the storage seed to create and protect their own keys or information. The TPM may also use a storage seed to protect the native OS and other customizable applications on the system.

To support the measurement of executed code, the TPM may provide Platform Configuration Registers (PCRs) 282-1, 282-2, . . . 282-N. The PCRs use an operation, called extend, to hash the existing PCR value of the measurement for any new code. In detail, the PCRs are initialized with the value of all zeros. When the first boot code is measured, that measurement is sent to the TPM and it extends that measurement into a PCR. The 'extend' operation takes the contents of the PCR (20 bytes of all zeros, initially) plus the measurement that was sent to the PCR, and sends that together into a hash engine, for example a Secure Hash Algorithm (SHA) hash engine. The output of the hash engine is then stored back into the corresponding PCR. The PCRs must therefore be the same size as the output of the hash engine (typically 20 bytes). As can be appreciated by a person in the pertinent art, the measurement sent to the TPM may have an arbitrary length. The PCRs can be read from the TPM, but cannot be overwritten, nor modified, via any operation other than an 'extend' operation. Accordingly, the PCRs are able to maintain reliable records of the boot sequence executed in the system. The boot sequence information stored in PCRs may be used to determine whether the system is tampered with or not. If any unexpected codes run on the system, the measurement of that code will result in a change to the PCRs. The changes with the PCRs may indicate that something out of the ordinary has executed on the system, or the system has been tampered with.

A TPM may contain multiple PCRs 282-1, 282-2, . . . 282-N. Thus, the TPM may set specific PCRs to be dedicated to measurements of specific types of code. For instance, one PCR could be dedicated to the measurement of drivers, one to option ROM, one the boot loader, and one for other miscellaneous operations. The TPM specification lists recommendations and requirements for multiple PCRs. However, as can be appreciated by a person in the pertinent art, functions of PCRs may be set variously depending on the needs of the system. The TPM 280 may contain a crypto and execution engine 283, a volatile key and session storage 284, a random number and key generator 285, and a non-volatile seed storage 286.

Figure 2B:
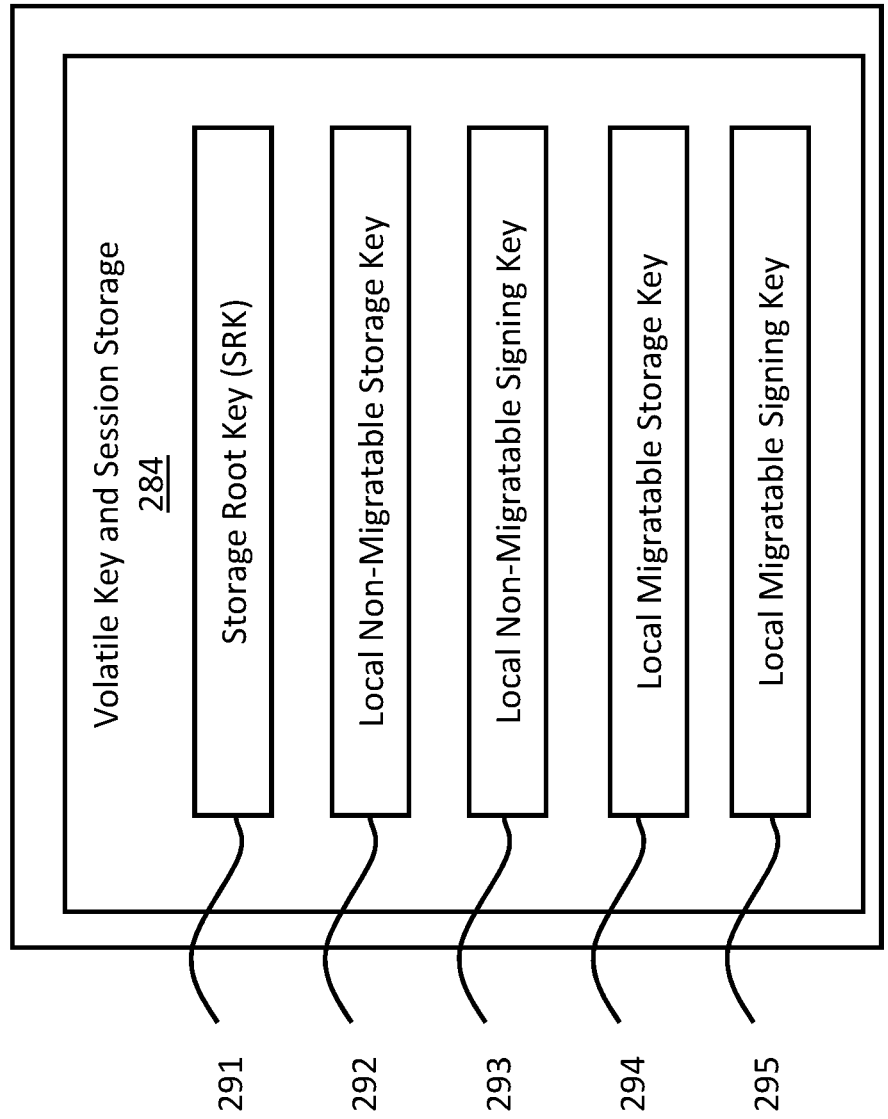
FIG. 2B is a block diagram showing secure keys stored in the TPM of FIG. 2A according to the concepts described herein.

Referring now to FIG. 2B, the TPM 280 may also provide a seed for a storage key. This key is called the Storage Root Key (SRK) 291 and the key is accessible by another module for the generation of new keys and random values. The SRK may be used to protect the validity of the keys. The keys created by the SRK can be migratable or non-migratable. A non-migratable key can only be used by the TPM which created the non-migratable key. A migratable key can be used by another module. As shown in FIG. 2B, signing keys 293, 295 and storage keys 292, 294 may be generated using the SRK. The TPM may also provide a security feature to authenticate the Unified Extensible Firmware Interface (UEFI) code (e.g., UEFI 222 in FIG. 2). The TPM authentication process measures UEFI code and extends the values into a PCR inside the TPM.

The inventive concepts described herein include wrapping a TPM library using both a Secure World and Normal World implementation. As described above, the processors may support execution in two isolated execution environments, known as the Secure World (SecW) and Normal World (NorW). These execution environments are primarily used to ensure security of native code, but the secure world can also be used to extend trust to external elements, such as a Trusted Platform Module (TPM). Porting of a TPM library may enable user access in the normal world, but also enable to regulate access from the secure world. This ported library may control the interface to the TPM and allows for connection with both local and remote TPM components. In detail, the solution is composed of a standard TPM library that runs inside the Normal World. The standard TPM library would function as it would on a standard host. By opening a Secure Monitor Call (SMC) to the TPM library, it is possible to transition execution to the secure world. The Secure World validates the request and generates the corresponding bitstream that should be sent to the TPM. This bitstream is then sent via a PCIe connection to a host computer, which then forwards the command to the actual TPM. The host computer returns the response (if any) via the PCIe bus. This is received by the Secure World code and returned to the Normal World application. The code on the host for communicating with the TPM can be located in the Unified Extensible Firmware Interface (UEFI) code or inside a hypervisor.

Figure 3:
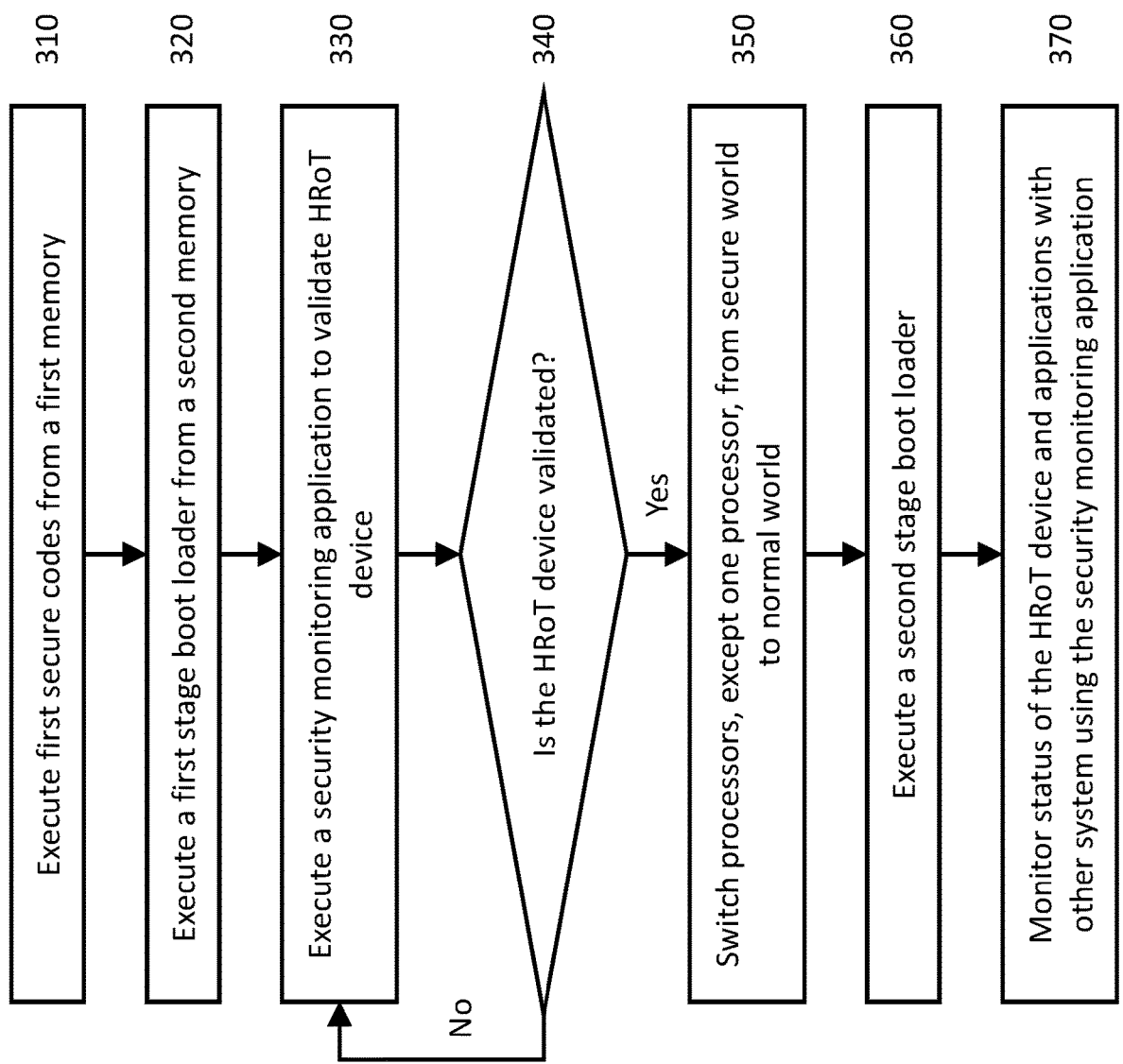
FIG. 3 is a flowchart of a secure booting process according to the concepts described herein.
Figure 4:
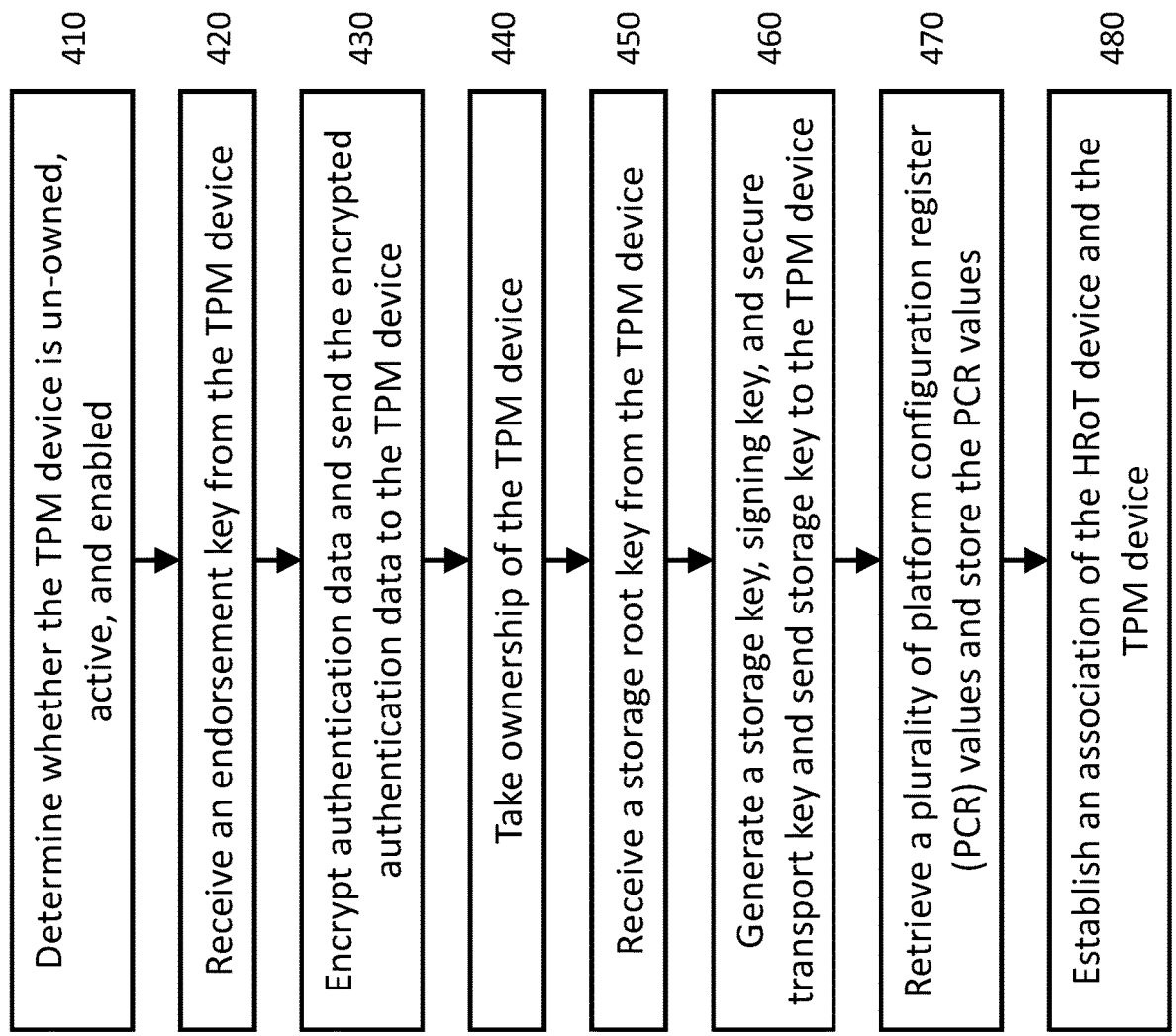
FIG. 4 is a flowchart of a discovery process for establishing a secure connection to a TPM according to the concepts described herein.
Figure 5:
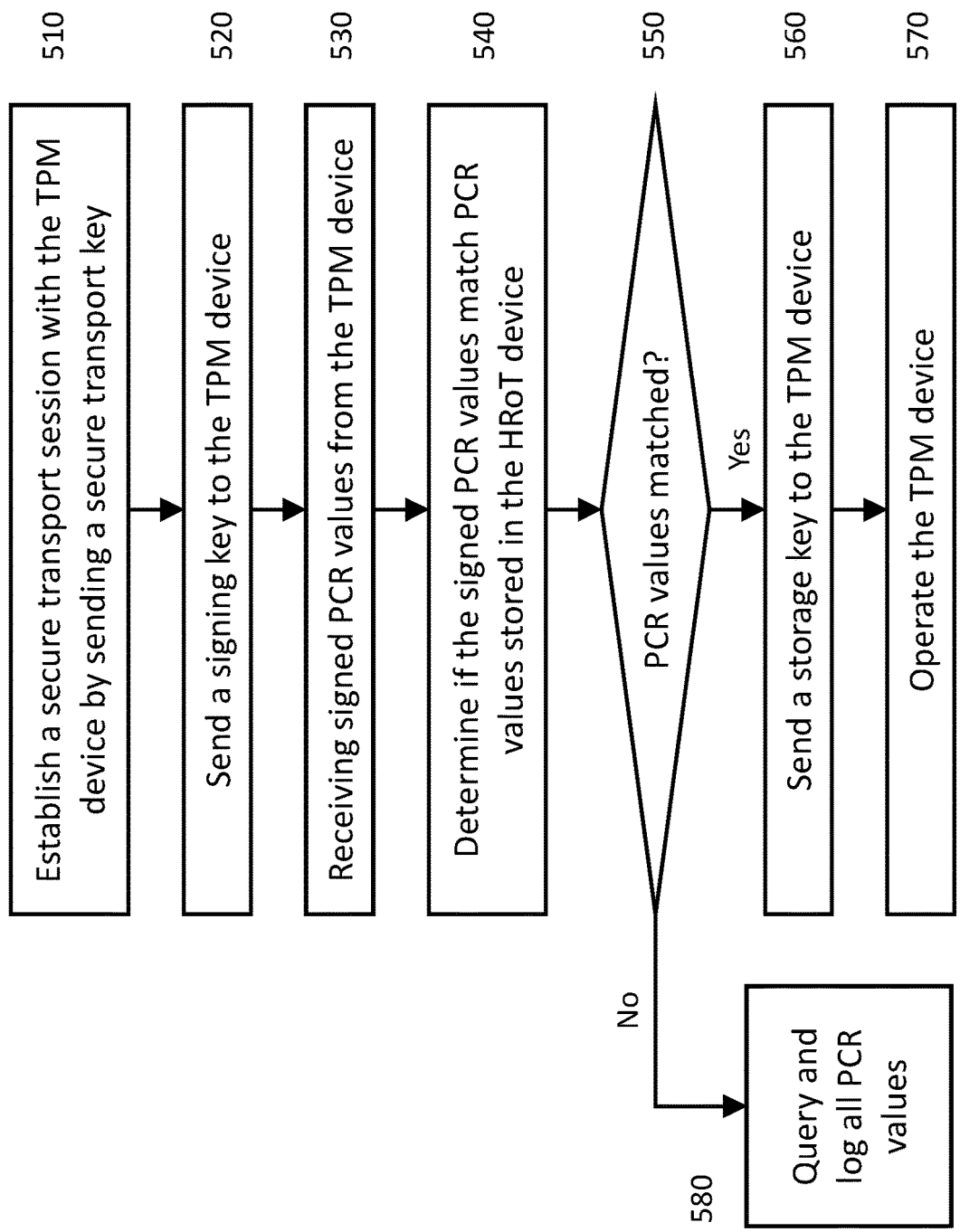
FIG. 5 is a flowchart of an operation process for operating with a TPM according to the concepts described herein.

FIGS. 3-5 are flow diagrams illustrating the processing performed by an HRoT device (e.g., within an HRoT device 110 shown and described above in conjunction with FIG. 1). Rectangular elements (typified by element 310 in FIG. 3), herein denoted "processing blocks," represent computer software instructions or groups of instructions and diamond shaped elements (typified by element 340 in FIG. 3), herein denoted decision blocks represent computer software instructions or groups of instructions which affect the flow of the processing blocks. The processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring now to FIG. 3, a secure booting process is shown that may be carried out by an HRoT device (e.g., HRoT device 110 discussed above in conjunction with FIG. 1). In processing step 310, when the HRoT device 110 initiates the secure booting process, one core (e.g., 112-1 in FIG. 1) among a plurality of cores (e.g., 112-1, 112-2, . . . 112-N in FIG. 1) may execute first secure boot codes from a first memory of the HRoT device 110. In some embodiments, the first memory may be an internal boot read-only-memory (ROM) (e.g., 114 in FIG. 1). Herein, only one core 112-1 among the cores 112-1, 112-2, . . . 112-N executes the entire secure boot codes, while the other cores remain in a holding pattern waiting to be initialized by the initially executing core 112-1.

In processing step 320, the HRoT device may load and execute First-Stage Boot Loader (FSBL) onto a second memory. In some embodiments, the FSBL may be loaded and executed onto an on-chip memory (e.g., 116 in FIG. 1). Furthermore, the FSBL may be decrypted and authenticated prior to execution to ensure that the FSBL code and the on-chip memory 116 that contains the FSBL are not tampered with. As described above, the FSBL may be loaded and executed in other memory, as can be appreciated by those of ordinary skill in the pertinent art.

In processing step 330, the HRoT device 110 may load and execute a security monitoring application. The security monitoring application may be loaded and executed in a programmable logic (PL) area (e.g., 118 in FIG. 1). The purpose of the security monitoring application is providing a 'tamper detection mechanism" by intercepting events of the system. The security monitoring application may also monitor inputs and outputs to/from the system. Before moving to a next stage, the security monitoring application validates the current state of the HRoT hardware to ensure that the HRoT device is not tampered with.

In decision step 340, it is determined whether the HRoT device is validated. If the HRoT device is validated, in processing step 350, the cores (e.g., 112-2, . . . 112-N in FIG. 1) of the processor (e.g., 112) except one secure core 112-1 may switch to the normal world from the secure world. The cores that are switched to the normal world may load and execute regular applications. At least one core needs to stay in the secure world in order to monitor the processors and application in the normal world, and also to communicate with the security monitoring application. In processing step 360, the loaded FSBL may load a security monitoring application (e.g., 226 in FIG. 2). The security monitoring application runs in a normal world. In processing step 370, the security monitoring application may continue to monitor the validity of the hardware, including the HRoT device, and the software, including applications running by the processors. The security monitoring application may continue to intercept events of the system and monitor inputs and outputs to/from the system. When the hardware and software are verified, the FSBL then loads the Second-Stage Boot-Loader (SSBL) into normal world memory. When the boot process is completed, other regular applications may be loaded and executed on the system.

Referring now to FIG. 4, a discovery process is shown for establishing a secure connection to a TPM (e.g., 140 in FIG. 1) that may be carried out by an HRoT device (e.g., 110 in FIG. 1). Discovery mode is an operational state that the HRoT device 110 enters on one of two occasions: when no prior record for an association with a TPM is found in the secure storage on the HRoT device 110, or when a command, for example 'Enter Discovery Mode', is received directing the HRoT device 110 to enter Discovery mode. The command is encrypted using a public key of the source device and, therefore, should be decrypted and authenticated before being serviced to the HRoT device. During Discovery, association information may be created, exchanged, and then stored as encrypted at a specific location in the secure storage on the HRoT device. This location is only accessible from the secure world and therefore may only be written and read from the application being executed therein. If nothing is found at this location, the HRoT device 110 will automatically enter Discovery mode. Otherwise, an authentication command must be provided. To support authenticated commands, a hash of a client-specific public key ($CLNT_{PUB}$) is stored in the HRoT device 110. In some embodiments, $CLNT_{PUB}$ is stored in the Boot ROM (e.g., 114 in FIG. 1). Using the corresponding client-specific private key ($CLNT_{PRI}$), the authenticated command message is encrypted and provided along with the public key $CLNT_{PUB}$. Once the hash of the provided key is validated, the authenticated command is decrypted and processed. A cryptographic nonce may be also exchanged to protect against replay attacks. The cryptographic nonce is used to introduce entropy into encrypted output, as well as to provide a "challenge-response" test. The nonce itself is a random value having a size usually between 4-32 bytes. The sender and receiver will include the nonce during each transaction. The sender and receiver are required to increment it prior to each transmission. Accordingly, if an attacker attempts to perform a replay attack, wherein they retransmitted a previously transmitted message, the nonce value would be out of sync and it would be detected as a malicious transmission. Once the security checks have passed, the system will enter Discovery mode. This procedure will allow the system to be paired and un-paired with systems as needed to support servicing and repairs without requiring replacement.

To establish a secure connection, the HRoT device and TPM send and receive a collection of cryptographic keys. The following table describes the keys that are used to establish a secure connection. The Discovery information generated during the discovery process is a collection of keys. The HRoT device contains the hash of the client-specific public key ($CLNT_{PUB}$) mentioned previously, as well as a random, unique-per-device Advanced Encryption Standard with 256 bits (AES-256) key ($HROT_{SEC}$). Additionally, the HRoT device may create a random AES-256 key that is used to encrypt the hypervisor ($HROT_{HYP}$). As discussed above, the TPM contains a seed for an endorsement key that is set by the manufacturer and is used to recreate the key for each time that the TPM is initialized. Although the private portion is not released outside the TPM, the public portion ($TPM_{PUBEK}$) is extracted and stored on the HRoT. Authentication Data ($TPM_{AD}$), a random 160-bit value, is created by the HRoT and used as identification material when taking ownership of the TPM and is used to help generate the TPM Storage Root Key ($TPM_{SRK}$). From the $TPM_{SRK}$, three additional keys are created for storage ($TPM_{STOR}$), signing ($TPM_{SIGN}$), and establishing secure transport sessions ($TPM_{TRAN}$).

| Symbol | Name | Description |
| --- | --- | --- |
| $TPM_{PUBEK}$ | Public Endorsement Key | Public portion of the endorsement key (EK) set by the TPM manufacturer. |
| $TPM_{AD}$ | Authentication Data | Random, 160-bit data generated by TPM owner, set during TakeOwnership call, and provided when required to prove ownership. |
| $TPM_{SRK}$ | Storage Root Key | The storage root key generated for the TPM owner during the TakeOwnership call. Serves as the root for all keys created during the Discovery process. |
| $TPM_{STOR}$ | TPM Storage Key | A non-migratable storage key used to encrypt and protect all subsequently created keys. |
| $TPM_{SIGN}$ | TPM Signing Key | A non-migratable signing key used to sign all data and reports received from the TPM. |

-continued

| Symbol | Name | Description |
| --- | --- | --- |
| $TPM_{TRAN}$ | TPM Transport Key | A non-migratable storage key used to create secure sessions between the HRoT and the TPM. |
| $CLNT_{PRI}$ | Client-specific Private Key | A private key generated and maintained by a client and used to sign commands sent to HRoT device. |
| $CLNT_{PUB}$ | Client-specific Public Key | A public key generated by a client and sent with all signed commands to HRoT device. |
| $HROT_{SEC}$ | HRoT Secret Key | A secret AES key generated and maintained by a client and stored inside secure, non-volatile storage on HRoT device. |
| $HROT_{HYP}$ | HRoT Hypervisor Key | A random AES key generated by the HRoT device and used to encrypt the hypervisor which runs on the host platform. |

In processing step 410, the HRoT device may determine whether a Trusted Platform Module (TPM) device is un-owned, active, and enabled. When the system receives an authenticated command to enter Discovery mode, it must first determine the current operational mode of the TPM 140 on the host platform 160. The current operational mode is determined by performing a sequence of calls to the TPM by querying the current states of the TPM and set or change the states of the TPM as necessary. The TPM may have three discrete states that determine its current operational modes. These three states are: owned or un-owned, active or inactive, and enabled or disabled. In order to perform the necessary exchange to associate the HRoT device with the TPM, the TPM must be in the "un-owned—active—enabled" state. If the TPM device is owned, HRoT device may clear owner of the TPM device. If the TPM device is not active, HRoT device may activate the TPM device. If the TPM device is not enabled, HRoT device may enable the TPM device.

When the HRoT device verifies, or sets, the required operation mode of the TPM, the HRoT device may perform the necessary exchange to create the needed association information. In processing block 420, the HRoT device may receive the public portion of an endorsement key $TPM_{PUBEK}$ from the TPM. In processing block 430, the HRoT device may generate authentication data $TPM_{AD}$. The HRoT device may encrypt the authentication data $TPM_{AD}$ with the $TPM_{PUBEK}$ and send it to the TPM. The processing blocks 420 and 430 are part of the 'take ownership' operation. In processing block 440, the HRoT device then may take ownership of the TPM 140.

Once ownership of the TPM is established, in processing block 450, the HRoT device may receive a storage root key ($TPM_{SRK}$) from the TPM. In processing block 460, the HRoT device may generate a storage key ($TPM_{STOR}$), a signing key ($TPM_{SIGN}$), and a secure transport key ($TPM_{TRAN}$). Then, the HRoT device transfer the $TPM_{STOR}$ key to the TPM. Herein the $TPM_{STOR}$ key is used to encrypt, or "seal," the $HROT_{HYP}$ key.

In processing block 470, the HRoT device may retrieve all Platform Configuration Register (PCR) values from the TPM that are recorded by the HRoT device. These PCR values will be used for comparison while in Operational mode. In processing block 480, the HRoT device may complete Discovery mode and establish an association with the TPM.

Referring now to FIG. 5, an operational process for operating a TPM (e.g., 140 in FIG. 1) may be carried out by an HRoT device (e.g., 110 in FIG. 1). Once Discovery mode has been performed for at least one host platform, the HRoT device may enter Operational mode. In this mode, the HRoT device boots up normally and awaits communication from the host UEFI module.

After initial communications are established as described in conjunction with FIG. 4, In processing block 510, the HRoT device 110 may send a secure transport key ($TPM_{TRAN}$) to the TPM 140 in order to establish secure transport sessions with the TPM 140. Transport sessions allow the HRoT device to encrypt requests/operations to the TPM, including rolling nonce that prohibit replay and man-in-the-middle attacks.

In processing block 520, when a secure transport session is established, the HRoT device 110 may send a signing key ($TPM_{SIGN}$) to the TPM 140 to be decrypted and loaded on the TPM. The $TPM_{SIGN}$ key is then used by the TPM to sign a hash of all the PCR values in the TPM 140. In processing block 530, the HRoT device receives a signed report of PCR hash values from the TPM. Each of the PCRs contains own hash value. Those hash values are collected into a predefined report format. In some embodiments, the simple table has a format that the first entry is for PCR0, the second for PCR1, and so on through entry N for PCR N–1. The TPM signs the report before transmitting to the HRoT device.

In processing block 540, the HRoT device may determine if the signed PCR values match the PCR values in the HRoT device that are received during Discovery mode (e.g., processing block 470 in FIG. 4) by comparing the hash values. If it is determined that the PCR values match the expected value, in decision block 550, the HRoT device may send a storage key ($TPM_{STOR}$) to the TPM (processing block 550). In order to properly decrypt the $TPM_{STOR}$ key, the PCR values must match the expected values. In processing block 580, if it is determined that the PCR values are not matched, the HRoT device queries all PCR values from the TPM for logging purpose to identify which PCR is invalid. In processing block, the HRoT device initiates operation of the TPM. In some embodiments, the HRoT device may send a protected hypervisor key that is stored in the HRoT device for decryption of the hypervisor key, or "unsealing," using the $TPM_{STOR}$ key. The HRoT contains, or generates, an AES key that is used to encrypt the boot partition of the host platform. That boot partition may contain a hypervisor or may contain a standard OS bootloader. The AES key is encrypted first by the HRoT Secret AES key and then sent to the TPM to be "sealed" (also referred to as "signed" or "encrypted"). This results in a doubly-encrypted key used to protect the boot partition. The key is decrypted or unsealed. The result of decryption is returned to the HRoT device, which then decrypts the result with a secrete AES-key ($HROT_{SEC}$). The output of this step is the HRoT Hypervisor key ($HROT_{HYP}$). Then, an encrypted hypervisor is transferred to the HRoT. The HRoT device decrypts the encrypted hypervisor with the $HROT_{HYP}$ and returns the decrypted hypervisor to the host system for execution. If the PCR values are not matched, the $TPM_{STOR}$ will not decrypt protected hypervisor key properly, and thus decryption of the protected hypervisor key will fail. The failure of decrypting the protected hypervisor key will prevent the system from booting.

Figure 6:
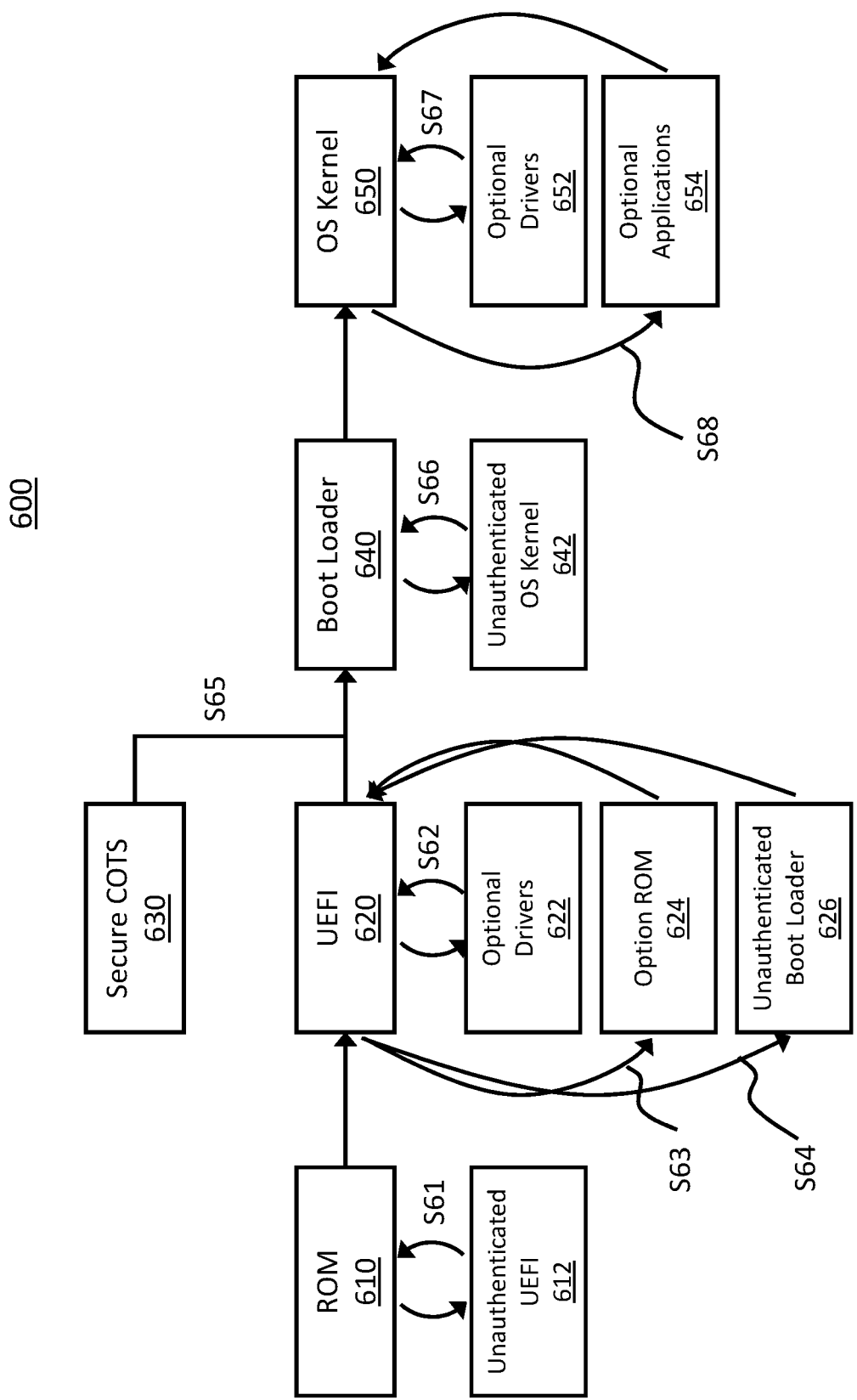
FIG. 6 is a diagram showing a secure booting process incorporating Unified Extensible Firmware Interface (UEFI) according to the concepts described herein.

Referring now to FIG. 6, a secure booting process incorporating UEFI (e.g., 222 in FIG. 2) and TPM (e.g., 140 in FIG. 1) may be executed by an HRoT device (e.g., 110 in FIG. 1). As described in conjunction with FIG. 2, UEFI may be used during a secure boot process. Furthermore, incorporating TPM 140 and UEFI with the HRoT device may result in a "Trusted Boot" implementation that will be described in detail below.

As described above, a secure boot process may start with loading and executing a secure boot code from a boot ROM (e.g., 114 in FIG. 1). When the secure boot code is executed, in step S61, the secure boot code may validate the UEFI code 612 that is not unauthenticated. When the UEFI code 612 is validated, the secure boot code may load and execute the UEFI code.

When a system boots with the UEFI code 620, optional drivers 622 may be used to support initial communications with connected devices (S62). Each of the connected devices may provide a more advanced, higher-feature driver in the form of an Option-ROM 624. The Option-ROM 624 may be stored in an HRoT device (e.g., 110 in FIG. 1) and loaded and executed during the boot sequence. In some embodiments, These Option-ROMs 624 may be stored at a predefined address within the address space in each of the connected devices. After establishing communications with the device, the UEFI code 620 scans the defined address for an Option-ROM 624, and if present, maps the code into its own address space and executes it as the new driver for the device (S63).

Before accessing the Option ROM 624, the Option ROM may be authenticated as part of the Trusted Boot process. All Option ROMs 624 must be signed using a private key (e.g., $TPM_{SIGN}$) whose public key (e.g., $TPM_{PUBEK}$) is available to the TPM during the boot process. In some embodiments, custom Option-ROMs may be implemented by a client, and then the custom Option ROMs are provided to platform manufacturers for signing. The signed Option-ROM can then be programmed into their commercial device and loaded and authenticated by the base UEFI code 620. In another embodiment, when an Option-ROM is proprietary and cannot be provided to platform manufacturers for signing, a client-specific public key ($CLNT_{PUB}$) that is used to authenticate Discovery commands is also stored in the base UEFI code and is available to authenticate the proprietary Option-ROM.

The loaded drivers from Option-ROM 624 may serve as a bridge between the HRoT device 110 and the host platform TPM 136. Because TPM commands are generated by the HRoT device, and some of the TPM commands are encrypted, the Option-ROM 624 may transfer all byte strings of the TPM commands created by the HRoT device to the TPM without any transformation and then returns the response from the TPM to the HRoT device. That is, the Option ROM 624 is not responsible for parsing or in any way analyzing the TPM commands. The Option-ROM 624 may provide an interface to the storage device (not shown) of the host platform. This capability is required for the HRoT device to read, encrypt, and then write the hypervisor to host storage while in Discovery mode, and then read and decrypt the hypervisor while in Operational mode.

The UEFI code 620 may also validate unauthenticated Boot Loader 626. The unauthenticated Boot Loader 626 may be the First Stage Boot Loader (FSBL) that is described in conjunction with FIG. 1. A Secure Commercial off-the-shelf (COTS) application or product 630 may be executed to provide additional functionalities. For example, the HRoT device may host additional "secure" functionality such as its own Pre-boot Execution Environment (PXE) server that would be used to boot the system, rather than using its OS. In a case that these functionalities are not trusted by the host platform, the HRoT may provide the functionalities instead. After the Boot Loader is loaded and executed, the Boot Loader 640 may validate, load, and execute unauthenticated OS Kernel 642 (S66). When the OS Kernel is loaded and executed, the OS Kernel 650 may load and execute additional drivers 652 and applications 654.

Figure 7:
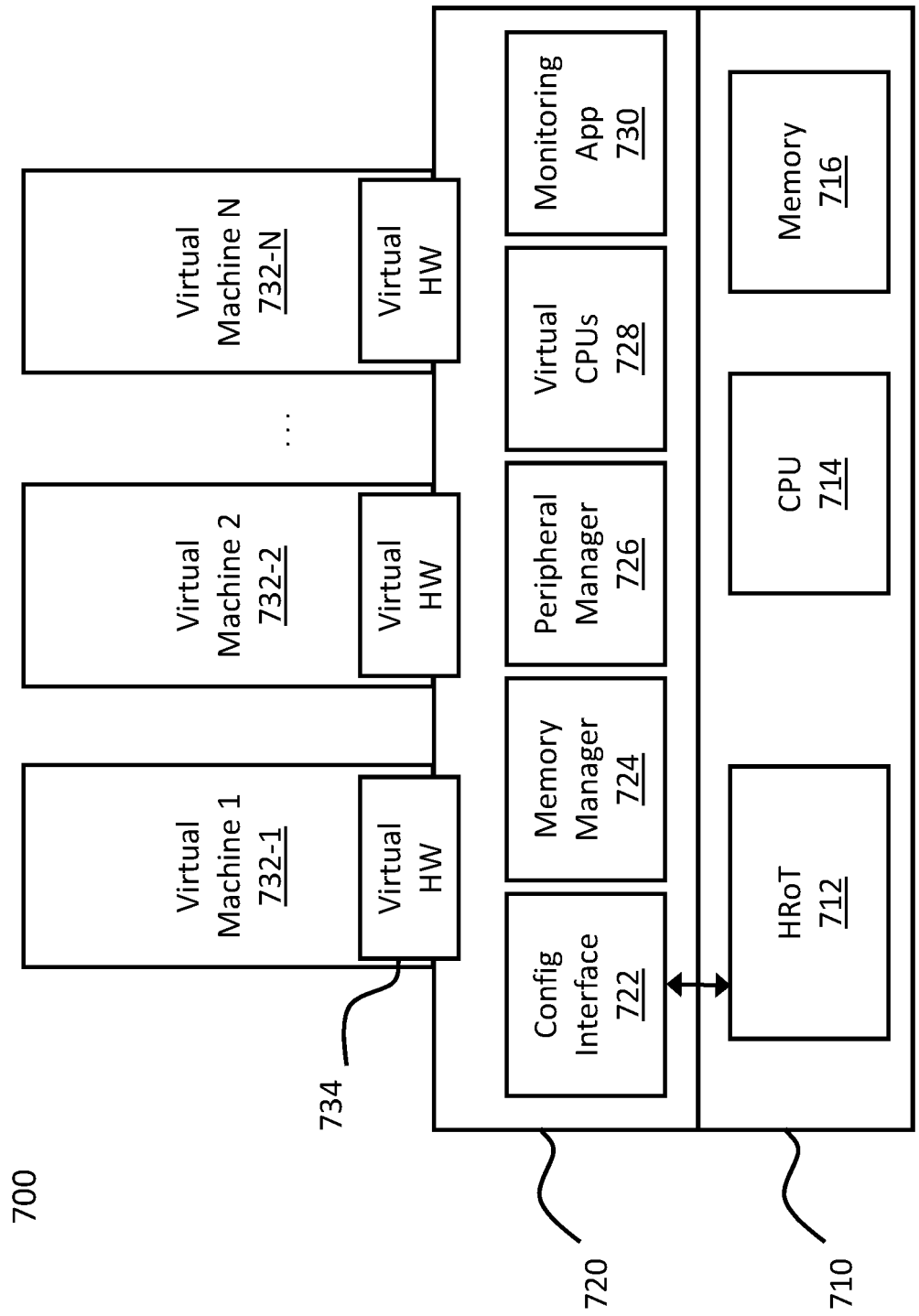
FIG. 7 is a diagram showing an architecture supporting virtual machines with an HRoT device according to the concepts described herein.

Referring now to FIG. 7, a hypervisor architecture 700 incorporating an HRoT device 712 is presented. The architecture 700 may include a hardware/firmware layer 710 and a virtual machine monitor (also referred to herein as "VMM," a virtual machine manager, or a hypervisor) layer 720. The virtual machine manager may run one or more virtual machines 732-1, 732-2, . . . 732-N. The hardware/firmware layer 710 may include an HRoT device 712, CPU 714, and memory 716. The hypervisor layer 720 may include a config interface 722, memory manager 724, peripheral manager 726, virtual CPUs 728, and security monitoring application 730. The config interface 722 may manage configuration information of the virtual machines. The memory manager 724 may manage memories allocated to each of the virtual machines from memory 716. The peripheral manager 726 may provide interfaces to peripheral devices so that the virtual machines may access the peripheral devices. The virtual CPUs 728 may allocate portions of CPU 714 to each of the virtual machines so that the virtual machines may operate in a way that each of the VMs has its CPU. The security monitoring application 730 may be substantially similar with the security monitoring application running in the firmware layer (e.g., 226 in FIG. 2). The security monitoring application 730 may run in Host Kernel of the VMM to monitor and validate each of the VMs.

As is known in the art, virtualization technology may provide the capability to support concurrent execution of multiple operating system environments. The VMM is similar to the kernel process for standard Operating Systems, including hardware support. The VMM is responsible for presenting the virtual hardware interface to execution environments, handling scheduling of system resources between environments, and allocating required resources as needed by each environment. Execution environments that run on top the VMM are called Virtual Machines (VMs). The VMs are usually owned and instantiated by a user of the system (referred to as guest VMs). In some embodiments, the VMM may include a controller environment referred to as the Host Kernel. This Host Kernel may allow administrators of the VM to interface with the VMM and properly configure the VMM for operation while providing such functionality in an isolated execution environment from guest VMs.

In some embodiments, the hypervisor architecture 700 may provide stronger security by ensuring isolation between Operating System environments and also providing continuous monitoring using a security monitoring application (e.g., 226 in FIG. 2). Furthermore, some portion of the security monitoring application may be incorporated into the VMM 720 to provide stronger security. The portions relocated to VMM may include validation of kernel memory and data structures, as well as hardware binding and decryption operations. By moving these portions to the VMM, the security features (validation of kernel memory and data structures, as well as hardware binding and decryption operations) are not accessible from any applications running inside the VMs. Accordingly, even if an attacker were able to circumvent the security monitoring application instance running with the VM, the attacker could not obtain information about these values or prevent the hypervisor from scanning VM memory for rogue code. An attacker is therefore required to not only break standard Operating System security but would have to do so in a manner undetectable by the security monitoring application and then break out of the VM and gain execution inside the VMM. Assuming that an attacker is able to create an attack capable of overcoming each of these security measures, the HRoT device 712 may continue monitoring of virtual machine environments. Because the security monitoring application runs in a separate execution environment, on a completely different processor, the rogue code running in the VMM could not prevent the monitoring performed by the HRoT device 712. If the attacker attempts other methods, the security monitoring application can detect that the system is tampered with, and the detection may halt the system or cause other security measures.

The configuration capabilities provided by the host kernel, as described above, may be moved to the HRoT device. By doing so, a potential risk of gaining access to the host kernel by an attacker may be prevented, because configuration information is loaded and stored on the HRoT device 712. The configuration information can be uploaded to the HRoT device 712 via secure communications, and each configuration element must be encrypted and signed specifically for the target HRoT device 712. Once the HRoT device 712 validates the authenticity and integrity of the configuration information, the HRoT device 712 then uploads this configuration information to the hypervisor during the boot sequence. The HRoT device 712 may write the configuration data to the VMM address space. In some embodiments, the HRoT device may access the VMM address space via Direct Memory Access (DMA) transactions. In detail, some communication bus (e.g., 132 in FIG. 1), such as Peripheral Component Interconnect Express (PCIe) bus, may allow devices to perform DMA transactions. Using this capability, the HRoT device 712 can be interfaced with another system via PCIe to provide security protections. The VMM 720 for the system is can be stored either on the host system or on the HRoT and may be encrypted by the HRoT if desired for additional security. Once the hypervisor is loaded and begins execution, the HRoT may provide continuous monitoring of hypervisor code and data structures on a periodic basis. That is, the VMM 720 and the HRoT device 712 may engage in a handshake conducted on a customizable frequency that ensures valid functionality of the hypervisor. When the communication is disrupted or the VMM code/data is found to be unexpectedly modified, the HRoT device 712 can overwrite the VMM with a latest verified version (or referred as to "golden version"). In addition, the HRoT device 712 may perform any other security response protocols as needed.

The HRoT device 712 may monitor and validate the contents of an unencrypted memory in each of the virtual machines 732-1, 732-2, . . . 732-N. As described above, the HRoT device 712 is connected to the VMM 720 over a PCIe interface and may perform Direct Memory Access (DMA) transactions with the VM memory to read current contents and determine whether the memory is tampered with by comparing the contents against reliable values. In some embodiments, the HRoT device may apply the same mechanism to monitor and validate the contents of an unencrypted memory of a host platform (e.g., 134 in FIG. 1).

To achieve the same purpose, conventional solutions utilize one of two approaches: in-line encryption of memory contents or restriction of application to execute out of internal cache on the processor. The former solution requires physical changes to the processor and is completely impractical for virtually all applications, whereas the second approach has significant performance impacts and is still constrained by the amount of cache available within the processor.

The contents in the memory 150 is a collection of 'sections.' The sections of memory are called 'pages'. Pages can vary in size based upon the processor architecture, OS that is used, or user configuration. The typical size of a page is 4 Kilobytes (KB). The security monitoring application 730 running in the Host Kernel may load and unload the pages. Every application executed in the VMs may be broken into pages that are cryptographically measured or hashed. Upon loading each application, measurements data for each application are sent to the HRoT device 712 where they are retained inside a scanning table. Any time one of these pages are loaded into memory, the physical address where that page will be stored is provided to the security monitoring application 730. The security monitoring application 730 relays the information to the HRoT device 712. The HRoT device 712 then perform periodic reads of the page-size section of memory located at the physical address provided, hash it, and compare it with the expected value. This sequence may continue as long as that page is resident in memory. If the processor ever needs to flush, or unload, the page from memory, the security monitoring application 730 may send a message to the HRoT device 712 to have it remove the physical address entry for the corresponding page from its table, after which the processor is free to flush the corresponding memory location. The HRoT device 712 maintains the hash value that corresponds to the now flushed page, but because the physical memory entry is blank, it knows the page is no longer resident and does not perform periodic verification of that page in memory. If the page is ever brought back into memory, the security monitoring application 730 provides the new physical address location to the HRoT device 712, which then updates its table entry and resumes verification of the page while in memory.

Figure 8:
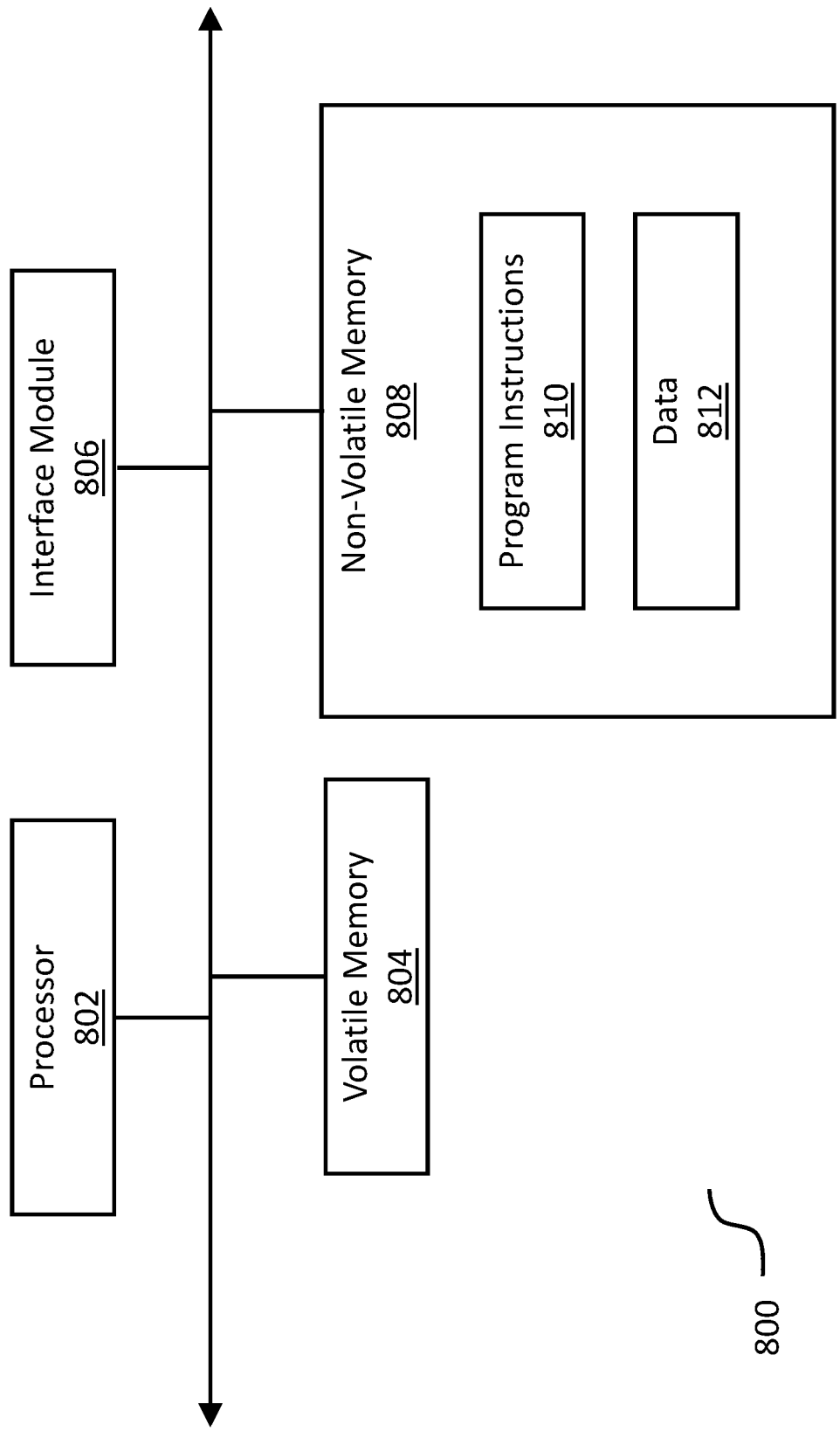
FIG. 8 is an illustrative implementation of a security system described in FIG. 1 according to the concepts described herein.

Referring now to FIG. 8, an illustrative implementation of a processing device 800 which may be suitable to implement the processing techniques described herein includes a processor 802, a volatile memory 804, a non-volatile memory 808 (e.g., hard disk) and the interface module 808 (e.g., a user interface, USB interface and so forth). The non-volatile memory 808 stores computer instructions 812, an operating system 818 and data 818. In one example, the computer instructions 812 are executed by the processor 802 out of volatile memory 804 to perform all or part of the processes described herein (e.g., processes 300, 400 or 500).

The processes described herein (e.g., process 300) is not limited to use with hardware and software of FIG. 1; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Figure 9:
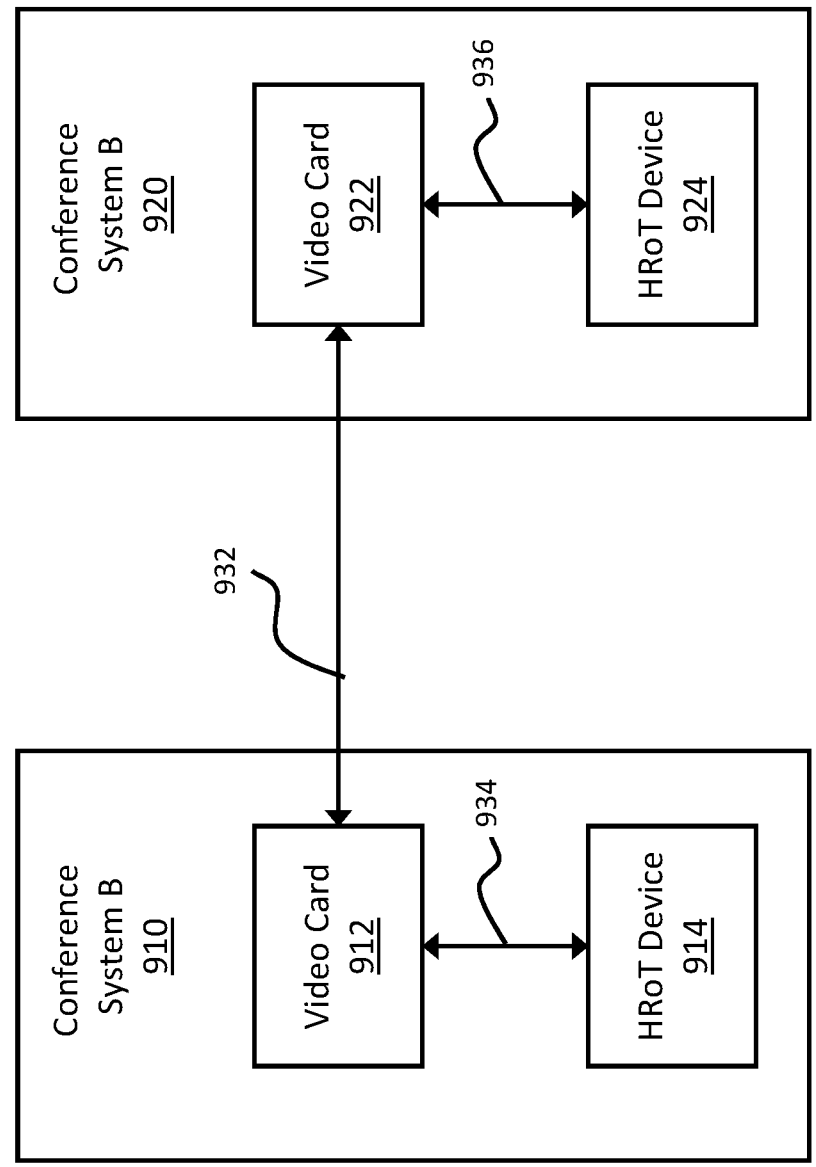
FIG. 9 is a block diagram of an illustrative video conferencing system utilizing HRoT devices.

Referring now to FIG. 9, using HRoT devices 914, 924 described above, a secure audio and video conferencing system 900 between two separate locations may be established. A secure audio and video conferencing between two locations usually requires purchasing of special equipment, extensive setup, continuous monitoring, and may necessitate a specific network. Using the HRoT solution may create a secure video card element that may be plugged into any computer system, connected to any computer network, and still support secure audio and video conferencing between two or more locations with the only minimal required initial setup. All data is encrypted in a sending system and decrypted in a receiving system on a video card. Accordingly, the data is not exposed to a host system as unencrypted, thereby eliminating the need to rely upon the security of the host platform.

In this architecture, an HRoT device 914, 924 may be coupled to commercially available video cards 912, 922 supporting audio and video capabilities. In some embodiments, the HRoT device may be a pre-provisioned M.2 root-of-trust card. As known in the art, M.2 is a specification for expansion cards and associated connectors that can be internally mounted in a system.

Each of the HRoT devices 914, 924 coupled video cards may receive their own RSA public and private keys that may be used to establish secure communications between the HRoT devices 914, 924. Additionally, the HRoT devices 914, 924 also maintain the public key of a trusted certificate authority that may be used to dynamically obtain the public key of a target system to communicate with. In some embodiments, the public key, or keys, may be pre-installed on the HRoT devices 914, 924, thereby eliminating the need to be authenticated by a separate Certified Authority (CA). The HRoT devices 914, 924 interact directly with their host video card 912, 922 and have a dedicated memory address (e.g., 120 in FIG. 1) available in order to facilitate communications with the host system. Through the use of a custom driver installed on the host system, the HRoT device 914, 924 can utilize the host network connection to establish a secure channel between the HRoT device and a target system. Once a secure connection is established, data passed between the two connected HRoT devices is completely encrypted and may only be decrypted by the corresponding HRoT device. The decrypted information may be stored in an address location inaccessible to the host system, but accessible to the graphics card. This allows the HRoT device to control the graphics card for presenting and receiving audio and video data. The HRoT device may also be used to validate the boot sequence of the video card itself, thereby ensuring the video card has not to be modified or tampered with in any way that would allow it to leak information to the host system. Furthermore, the HRoT device may be bound to a specific video card, preventing the HRoT device from being swapped between different HRoT device. With all data encrypted by the HRoT device only, the host system is not able to access unencrypted information. Accordingly, the video card enhanced with the HRoT device may be plugged into any system at any time over any network and still is able to provide secure communications.

While it may be possible for a person or a system that has physical access to the video card may be able to extract unencrypted information, this risk can be ignored because the person or system do not need to access data for the communication since the person or system locates where the communications are occurring. Software attacks against the video card and drivers used by the video card are also ineffective. For example, if a denial of service attack is performed to prevent information from being transmitted, the attacker needs to attempt re-routing video/audio output to a different IP address from the expected address. In this case, the cryptographic handshake between the two HRoT devices 914, 924 would fail, which prevents further communication.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Accordingly, other embodiments are within the scope of the following claims.

What is claimed is:

1. A method running on a security device, the method comprising:
    executing a first secure boot code from a first memory by one of a plurality of cores of a processor, wherein the plurality of cores runs in a secure world;
    executing a first-stage boot loader (FSBL) from a second memory;
    executing a security monitoring application to validate the security device;
    in response to the security device being validated, switching some of the plurality of cores from the secure world to a normal world, wherein at least one of the plurality of cores remains in the secure world to communicate with the security monitoring application;
    executing a second-stage boot loader (SSBL); and
    monitoring, via the security monitoring application, status of the security device and communications between the security device and at least one external system,
    wherein a software portion of the security monitoring application runs on the second memory and a hardware portion of the security monitoring application runs on a programmable logic (PL) area.

2. The method of claim 1, wherein the FSBL is authenticated, decrypted, and loaded onto the second memory before the FSBL is executed.

3. The method of claim 1, further comprising:
loading at least one secure application that is executed by at least one of the plurality of cores that runs in the secure world, wherein the at least one secure application is configured to communicate with the security monitoring application.

4. The method of claim 3, wherein the at least one secure application is configured to communicate with a trusted platform module (TPM) device.

5. The method of claim 4, further comprising:
loading at least one regular application that is executed by one of the plurality of cores that runs in the normal world,
wherein the at least one regular application communicates with the at least one secure application to perform any transactions.

6. The method of claim 1, wherein only one of the plurality of cores operates to execute the first secure boot code.

7. The method of claim 1, wherein the SSBL is authenticated, decrypted, and stored into the second memory before the SSBL is executed.

8. A system for secure booting, the system comprising:
a security device comprising a processor, wherein the processor comprises a plurality of cores, a first memory, and a second memory,
wherein the plurality of cores is configured to:
execute a first secure boot code from the first memory by one of the plurality of cores, wherein the plurality of cores runs in a secure world;
execute a first-stage boot loader (FSBL) from the second memory;
execute a security monitoring application to validate the security device;
in response to the security device being validated, switch some of the plurality of cores from the secure world to a normal world, wherein at least one of the plurality of cores remains in the secure world to communicate with the security monitoring application;
execute a second-stage boot loader (SSBL); and
monitor, via the security monitoring application, status of the security device and communications between the security device and at least one external system, further comprising a programmable logic (PL) area, wherein a software portion of the security monitoring application runs on the second memory and a hardware portion of the security monitoring application runs on the PL area.

9. The system of claim 8, wherein the security device comprises a Hardware Root of Trust (HRoT) device.

10. The system of claim 8, wherein the first memory comprises an internal boot read-only memory (ROM).

11. The system of claim 8, wherein the second memory comprises an on-chip memory (OCM).

12. The system of claim 8, wherein the FSBL is authenticated, decrypted, and loaded onto the second memory before the FSBL is executed.

13. The system of claim 8, wherein the plurality of processors is further configured to:
load at least one secure application that is executed by at least one of the plurality of cores that runs in the secure world, wherein the at least one secure application is configured to communicate with the security monitoring application.

14. A Hardware Root of Trust (HRoT) device, the device comprising:
a processor having a plurality of cores, a first memory and a second memory,
wherein the plurality of cores is configured to:
execute a first secure boot code from the first memory, wherein the plurality of cores runs in a secure world;
execute a first-stage boot loader (FSBL) from the second memory;
execute a security monitoring application to validate the HRoT device;
in response to the computer being validated, switch some of the plurality of cores from the secure world to a normal world, wherein at least one of the plurality of cores remains in the secure world to communicate with the security monitoring application;
execute a second-stage boot loader (SSBL); and
monitor, via the security monitoring application, status of the HRoT device and communications between the HRoT device and at least one external system,
the HRoT device further comprising a programmable logic (PL) area, wherein a software portion of the security monitoring application runs on the plurality of cores and a hardware portion of the security monitoring application runs on the PL area.

15. The HRoT device of claim 14, wherein the first memory comprises an internal boot read-only memory (ROM).

16. The HRoT device of claim 14, wherein the second memory comprises an on-chip memory (OCM).

* * * * *